United States Patent [19]
Slates et al.

[11] Patent Number: 5,744,040
[45] Date of Patent: Apr. 28, 1998

[54] APPARATUS AND METHOD FOR REMOVING DISSOLVED HYDROGEN SULFIDE FROM WATER

[75] Inventors: Charles E. Slates, Sylvania; Edrice L. Bakies, Toledo; Larry D. Kohlenberg, Maumee; Mark C. Slates, Bowling Green, all of Ohio

[73] Assignee: Sulfur-Tech Water Systems, Inc., Toledo, Ohio

[21] Appl. No.: 653,405

[22] Filed: May 24, 1996

[51] Int. Cl.⁶ .................................. C02F 1/58; C02F 1/74
[52] U.S. Cl. .................. 210/664; 210/665; 210/669; 210/678; 210/721; 210/747; 210/750; 210/807; 210/170; 210/202; 210/278; 210/916
[58] Field of Search .................. 210/721, 722, 210/202, 916, 265, 278, 279, 170, 747, 750, 665, 669, 668, 670, 678, 807, 664

[56] References Cited

U.S. PATENT DOCUMENTS

| | | | |
|---|---|---|---|
| 858,183 | 6/1907 | Holle . | |
| 888,090 | 5/1908 | Kestner . | |
| 1,827,583 | 10/1931 | James . | |
| 1,964,487 | 6/1934 | Smith | 216/16 |
| 2,060,557 | 11/1936 | Davis | 261/15 |
| 2,128,311 | 8/1938 | Mertes | 210/722 |
| 2,237,882 | 4/1941 | Lawlor et al. | 210/26 |
| 2,370,772 | 3/1945 | Bowers | 210/259 |
| 2,379,753 | 7/1945 | Sebald | 210/14 |
| 2,872,415 | 2/1959 | Schleyer | 210/750 |
| 2,890,838 | 6/1959 | Jannsen | 210/278 |
| 3,109,453 | 11/1963 | Lincoln | 210/279 |
| 3,178,024 | 4/1965 | Jacuzzi | 210/278 |
| 3,335,752 | 8/1967 | Hiers et al. | 210/278 |
| 3,649,532 | 3/1972 | McLean | 210/48 |
| 4,116,387 | 9/1978 | Kremer, Jr. et al. | 239/338 |
| 4,157,304 | 6/1979 | Molvar | 210/220 |
| 4,162,970 | 7/1979 | Zlokarnik | 210/15 |
| 4,162,971 | 7/1979 | Zlokarnick et al. | 210/15 |
| 4,430,228 | 2/1984 | Paterson | 210/665 |
| 4,522,151 | 6/1985 | Arbisi et al. | 119/3 |
| 4,526,692 | 7/1985 | Yohe et al. | 210/747 |
| 4,534,867 | 8/1985 | Kreusch et al. | 210/722 |
| 4,563,782 | 1/1986 | Dijkhuizen | 4/542 |
| 4,608,163 | 8/1986 | Yohe et al. | 210/150 |
| 4,659,463 | 4/1987 | Chandler et al. | 210/202 |
| 4,828,768 | 5/1989 | Talmor | 261/116 |
| 4,839,057 | 6/1989 | White | 210/916 |
| 4,840,753 | 6/1989 | Jungmann et al. | 261/76 |
| 4,857,184 | 8/1989 | DeLoach | 210/128 |
| 4,861,352 | 8/1989 | Cheng | 55/53 |
| 4,867,918 | 9/1989 | Kiyonaga et al. | 261/76 |
| 4,885,084 | 12/1989 | Doyle | 210/132 |
| 4,966,692 | 10/1990 | Overy | 210/123 |
| 4,992,181 | 2/1991 | Siebert | 210/744 |
| 5,054,423 | 10/1991 | Escobal | 119/5 |
| 5,061,458 | 10/1991 | Miller | 422/173 |

(List continued on next page.)

OTHER PUBLICATIONS

Webster's New Riverside University Dictionary, p. 135 (1984).

*Primary Examiner*—Cynthia L. Nessler
*Attorney, Agent, or Firm*—Emch, Schaffer, Schaub & Porcello Co., L.P.A.

[57] ABSTRACT

An apparatus for removing dissolved hydrogen sulfide from water including an atomizing tank defining an open end. A manifold is positioned adjacent the open end. The manifold defines an inlet channel having a first inlet port and a second inlet port. The first inlet port is in communication with aerated water containing dissolved hydrogen sulfide. An atomizing nozzle is in communication with the second inlet port for atomizing the water to cause the dissolved hydrogen sulfide to react with oxygen in the air to form sulfate in the atomizing tank. At least one filtering tank is in communication with the atomizing tank for filtering the sulfate from the water. The method of the present invention includes the steps of: (a) aerating water containing dissolved hydrogen sulfide with air at a predetermined pressure; and (b) atomizing the water to cause the dissolved hydrogen sulfide to react with oxygen in the air to form sulfate.

25 Claims, 4 Drawing Sheets

U.S. PATENT DOCUMENTS

| | | | |
|---|---|---|---|
| 5,069,796 | 12/1991 | Fox | 210/664 |
| 5,096,580 | 3/1992 | Auchincloss | 210/202 |
| 5,096,596 | 3/1992 | Hellenbrand et al. | 210/721 |
| 5,147,530 | 9/1992 | Chandler et al. | 210/90 |
| 5,173,092 | 12/1992 | Rudder | 55/53 |
| 5,292,440 | 3/1994 | Hardison | 210/721 |
| 5,354,459 | 10/1994 | Smith | 210/188 |
| 5,460,731 | 10/1995 | St. Pierre | 210/722 |
| B1 5,096,596 | 10/1995 | Hellenbrand | 210/807 |

APPARATUS AND METHOD FOR REMOVING DISSOLVED HYDROGEN SULFIDE FROM WATER

BACKGROUND OF THE INVENTION

The present invention relates generally to apparatus for removing dissolved hydrogen sulfide from water. More specifically, the invention is directed to apparatus having an atomizing tank in which water containing dissolved hydrogen sulfide reacts with oxygen to form sulfate.

The water and sulfate are then transported to a filtering tank where the sulfate is filtered from the water. The present invention is further directed to a method for removing dissolved hydrogen sulfide from water.

Apparatus for removing dissolved hydrogen sulfide from water is known in the art. An example of such apparatus is disclosed in U.S. Pat. No. 5,354,459, and the patents cited therein. It has been found that the prior art apparatus is expensive, complex and difficult to maintain. Therefore, there is a need for an apparatus and a method for removing dissolved hydrogen sulfide from water that is relatively inexpensive, simple and easy to maintain. The present invention satisfies this need.

SUMMARY OF THE INVENTION

The present invention is directed to apparatus for removing dissolved hydrogen sulfide from water that includes an atomizing tank and at least one filtering tank. The atomizing tank defines an open end. A manifold is positioned adjacent the open end. The manifold defines an inlet channel having a first inlet port and a second inlet port. The first inlet port is in communication with aerated water containing dissolved hydrogen sulfide. The apparatus further includes an atomizing nozzle in communication with the second inlet port for atomizing the water to cause the dissolved hydrogen sulfide to react with oxygen to form sulfate in the atomizing tank. The filtering tank is in communication with the atomizing tank. Water and sulfate are transported to the filtering tank where the sulfate is removed from the water.

The method of the present invention includes the steps of: (a) aerating water containing dissolved hydrogen sulfide with air at a predetermined pressure; and (b) atomizing the water to cause the dissolved hydrogen sulfide to react with oxygen in the air to form sulfate.

The primary object of the present invention is to provide an apparatus and a method for removing dissolved hydrogen sulfide from water.

It is an important object of the present invention to provide a manifold adjacent the open end of an atomizing tank that defines an inlet channel having a first inlet port and a second inlet port wherein the first inlet channel is in communication with aerated water containing dissolved hydrogen sulfide and the second inlet port is in communication with an atomizing nozzle.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
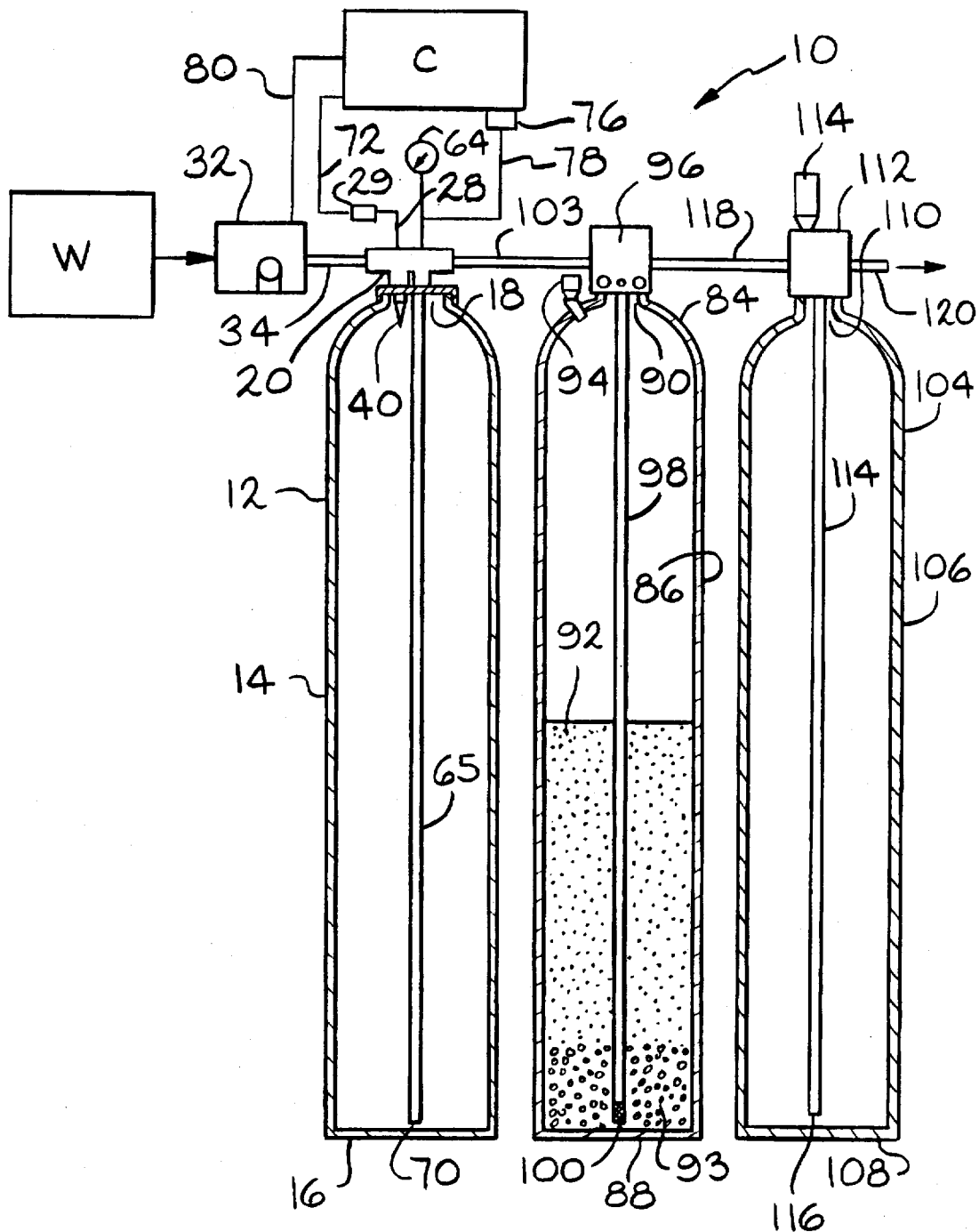
FIG. 1 is a schematic view of an embodiment of the present invention with the tanks shown in cross section.

The preferred embodiments and best mode of the present invention will now be described in detail with reference being made to the drawings. The apparatus of the present invention is indicated generally in the drawings by the reference number "10".

Figure 4:
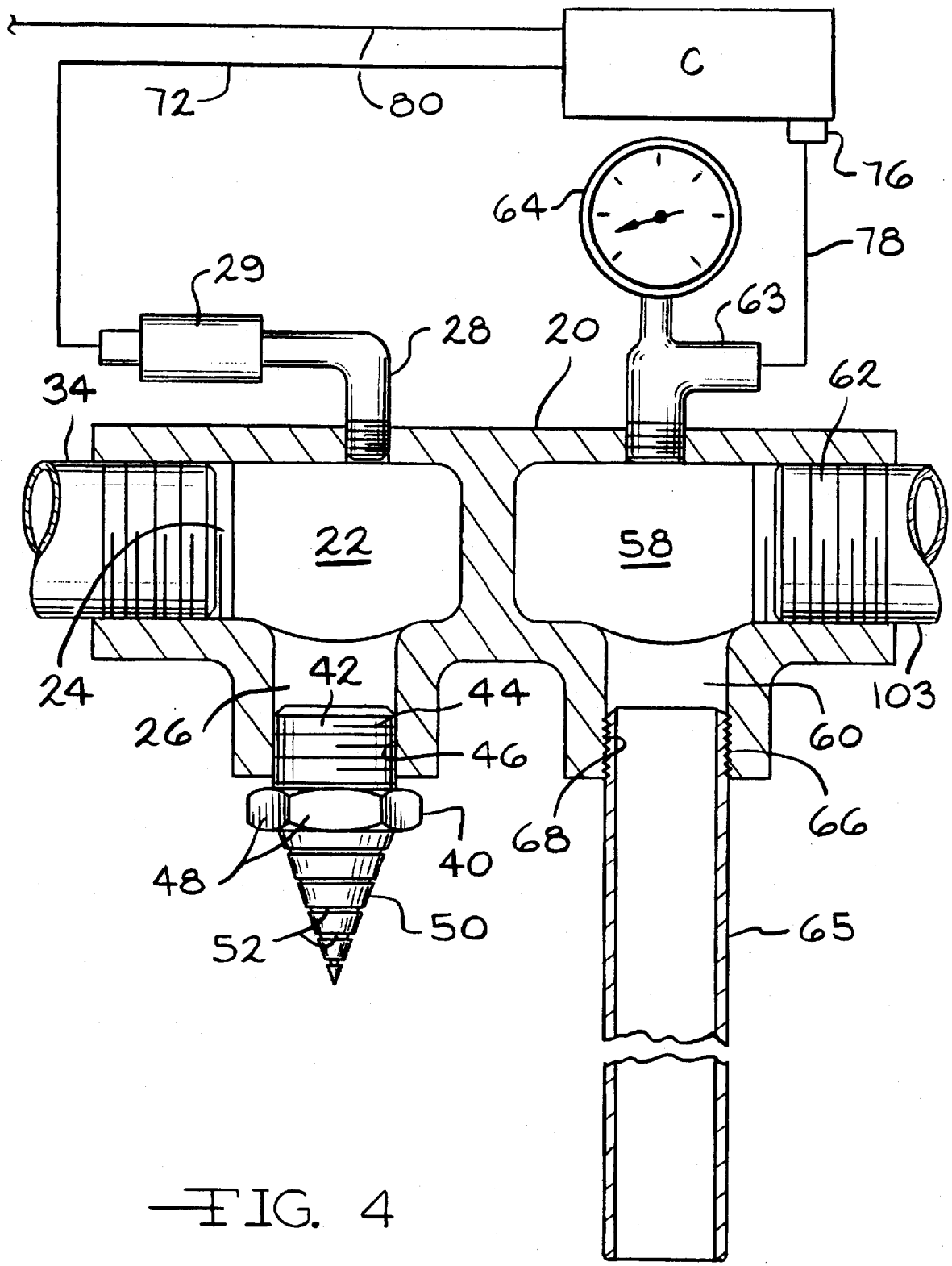
FIG. 4 is a cross sectional view of the manifold according to the present invention.

Referring to FIGS. 1 and 4, the apparatus 10 includes an atomizing tank 12 having a cylindrical wall 14. The atomizing tank 12 further includes a closed bottom wall 16 and an opposed open end 18. A manifold 20 is positioned adjacent the open end 18.

As shown in FIG. 4, the manifold 20 defines an inlet channel 22 having a first inlet port 24 and a second inlet port 26. The inlet channel 22 is in communication with an elbow 28 having a check valve 29. The elbow 28 is in communication with a source of compressed air, such as a compressor C.

Referring to FIGS. 1 and 4, the first inlet port 24 of the manifold 20 is in communication with a water source W containing dissolved hydrogen sulfide, such as a well. An automatic valve 32 is positioned in fluid line 34 between the water source W and the manifold 20. The automatic valve 32 regulates water flow to the first inlet port 24.

As shown in FIGS. 1 and 4, the apparatus 10 includes a one-piece atomizing nozzle 40 in communication with the second inlet port 26 of the manifold 20. The atomizing nozzle 40 is affixed to the second inlet port 26 at a connection end 42 that includes a plurality of threads 44. The threads 44 mate with a plurality of threads 46 that are defined by the second inlet port 26. This allows the atomizing nozzle 40 to be screwed into position using a tool (not shown) that engages a plurality of wrench flats 48. The atomizing nozzle 40 includes a conical atomizing tip 50. The atomizing tip 50 includes a plurality of atomizing openings 52 that cause water under pressure to atomize into discrete droplets. In the preferred embodiment, the atomizing openings 52 allow approximately 16 gallons of water to be atomized per minute.

Referring still to FIG. 4, the manifold 20 further defines an outlet channel 58 having a first outlet port 60 and a second outlet port 62. The outlet channel 58 is in communication with a second elbow 63 having a pressure gauge 64. An atomizing tank tube 65 is in communication with the first outlet port 60. The atomizing tank tube 65 includes a plurality of threads 66 that are received by a plurality of mating threads 68 defined by the first outlet port 60. As shown in FIG. 1, the atomizing tank tube 65 extends from the manifold 20 to an open end 70 adjacent the bottom wall 16 of the atomizing tank 12.

As shown schematically in FIG. 1, the apparatus 10 includes the compressor C. The compressor C introduces air under pressure through air line 72 to the elbow 28 into the inlet channel 22 to aerate the water from line 34 prior to the point where the water passes through the atomizing nozzle 40. The air pressure is in the range from about 30 p.s.i. to about 120 p.s.i., with 90 p.s.i. being preferred.

As shown in FIGS. 1 and 4, the compressor C includes a pressure switch 76 that is in communication with the second elbow 63 through fluid line 78. The compressor C is also in communication with the automatic valve 32 through electrical line 80. As discussed below, when pressure in the atomizing tank 12 drops, the pressure switch 76 is actuated to actuate the compressor C. Actuation of the compressor C, causes pressurized air to flow through line 72. The compressor C also signals the automatic valve 32 to open to allow water from the water source W to enter fluid line 34 and the first inlet port 24.

Referring to FIG. 1, the apparatus 10 includes at least one filtering tank 84. The filtering tank includes a cylindrical wall 86 having a closed bottom wall 88 and an opposed open end 90. The filtering tank 84 contains a filter media 92 resting on a bed of gravel 93. In the preferred embodiment, the filter media 92 is a mineral form of manganese dioxide. It has been found that this type of filter media removes sulfate from water. The filtering tank 84 includes a vent 94 in the cylindrical wall 86. The vent 94 allows excess air to pass to the exterior of the filtering tank 84.

Still referring to FIG. 1, the apparatus 10 includes a conventional backwash control system 96 adjacent the open end 90 of the filtering tank 84. The backwash control system 96 can include a timer (not shown). At predetermined times, the backwash control system 96 can be actuated to backwash or cleanse sulfate from the filtering tank 84. A filtering tank tube 98 extends from the backwash control system 96 to a screen basket 100 adjacent the bottom wall 88 of the filtering tank 84. The filtering tank tube 98 extends into the filter media 92 and the gravel 93.

Referring to FIGS. 1 and 4, the filtering tank 84 is in communication with the atomizing tank 1 2 through fluid line 103. One end of line 103 is attached to the second outlet port 62 of the manifold 20 and the other end is attached to the backwash control system 96.

As shown in FIG. 1, the apparatus 10 includes a deaerating tank 104. The deaerating tank 104 includes a cylindrical wall 106, a bottom wall 108 and an opposed open end 110. A head 112 is positioned adjacent the open end 110. The head 11 2 includes a head vent 114 that allows air to escape from the deaerating tank 104. A deaerating tank tube 114 extends from the head 112 to an end 116 adjacent the bottom wall 108. The deaerating tank 104 is in communication with the filtering tank 84 through fluid line 118 that is in communication with the backwash control system 96 and the head 112. The deaerating tank 104 is in communication with, for example, a faucet (not shown) through fluid line 120.

The operation of the apparatus 10 and the method of the present invention will now be described. When the water pressure drops in the atomizing tank 12, there is a drop in water pressure in line 78. Such drop in pressure actuates the pressure switch 76. Actuation of the pressure switch 76 actuates the air compressor C. The compressor C causes pressurized air to travel through line 72 to elbow 28. The air is then introduced into the inlet channel 22. Actuation of the pressure switch 76 also causes the compressor C to actuate the automatic valve 32 by sending an electrical signal through line 80. Actuation of the automatic valve 32 opens the valve to allow water containing dissolved hydrogen sulfide from water source W to enter line 34. Pressurized air from elbow 28 is then introduced to the water containing dissolved hydrogen sulfide in the inlet channel 22. The aerated water then flows into the atomizing tip 50 of the atomizing nozzle 40 and through the atomizing openings 52. The aerated water is forced through the atomizing openings 52 to mix the air and water to create a fine mist. During this process, the dissolved hydrogen sulfide becomes a gas. The oxygen in the air reacts with the hydrogen sulfide gas to form sulfate. The discrete water droplets in the mist and the sulfate are contained in the atomizing tank 1 2. The water and sulfate are then forced up through the atomizing tank tube 65 through outlet channel 58 of the manifold 20.

The water and sulfate travel through line 103 into the filtering tank 84. The water and sulfate are then forced through the filter media 92. The filter media 92 removes the sulfate and other compounds from the water. Excess air is allowed to escape through vent 94.

The water is forced through the screen basket 100 of the filtering tank tube 98 through line 118 and into the deaerating tank 104. In the deaerating tank 104, the excess air in the water is allowed to escape through the head vent 114. When a faucet, for example, is opened, potable water in the deaerating tank 104 travels through the deaerating tank tube 114 into line 120 and to the faucet. Removal of water from the deaerating tank 104 causes pressure in the atomizing tank 12 to drop thereby causing the apparatus 10 to repeat the cycle. The backwash control system 96 can be set to run at predetermined times to backwash the filtering tank 84. The apparatus 10, as shown in FIG. 1, is used in applications where the dissolved hydrogen sulfide in the water from water source W is approximately 10 parts per million or less.

Figure 2:
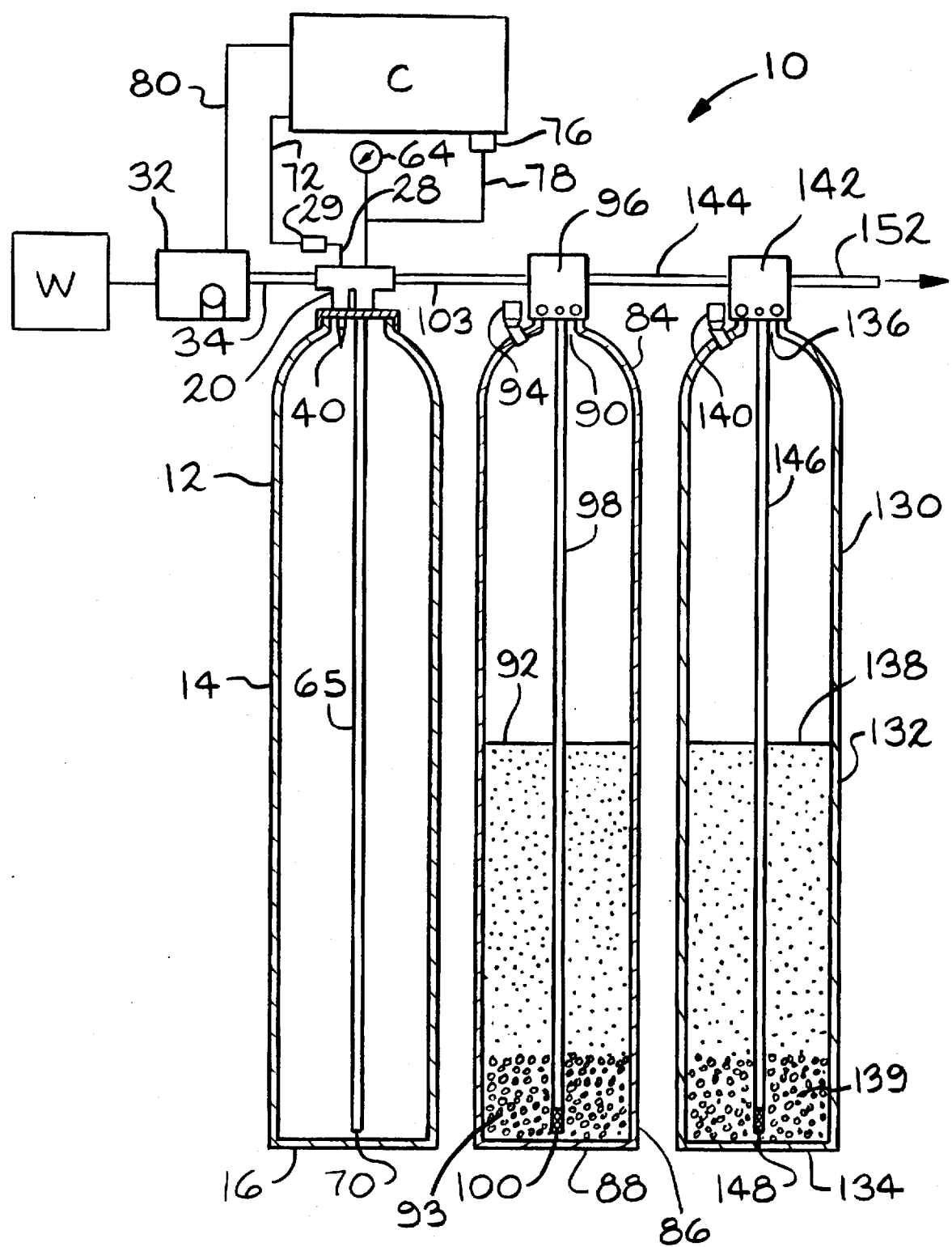
FIG. 2 is a schematic view of an alternative embodiment of the present invention with the tanks shown in cross section.

An alternative embodiment of the present invention is shown in FIG. 2. In this embodiment, the apparatus 10 includes all of the features of the embodiment shown in FIG. 1 except the deaerating tank 104 has been eliminated and replaced by a second filtering tank 130. The second filtering tank 130 includes a cylindrical wall 132, a bottom wall 134 and an opposed open end 136. The second filtering tank 130 contains additional filter media 138 resting on a bed of gravel 139. The filter media 138 is a mineral form of manganese dioxide. A vent 140 is positioned on the cylindrical wall 132. A second conventional backwash control system 142 having a timer (not shown) is positioned adjacent the open end 136. The second filtering tank 130 is in communication with the filtering tank 84 by fluid line 144 that extends between the backwash control system 96 and the second backwash control system 142. A second filtering tank tube 146 extends from the second backwash control system 142 to a second screen basket 148 adjacent the bottom wall 134 of the second filtering tank 130. The second filtering tank 130 is in communication with, for example, a faucet through fluid line 152.

The operation and method of the apparatus 10, as shown in FIG. 2, are similar to those of the first embodiment. However, in the alternative embodiment, there is additional filtering of the water and sulfate through the second filtering tank 130. The embodiment shown in FIG. 2 is used in applications where the dissolved hydrogen sulfide in the water from water source W is in the range from about 10 to about 40 parts per million. The deaerating tank 104 can be eliminated because excess air is allowed to escape through vents 94 and 140 prior to movement of the water through line 152. The backwash control system 96 and the second backwash control system 142 can be actuated at predetermined times in order to backwash the filtering tank 84 and the second filtering tank 130, respectively.

Figure 3:
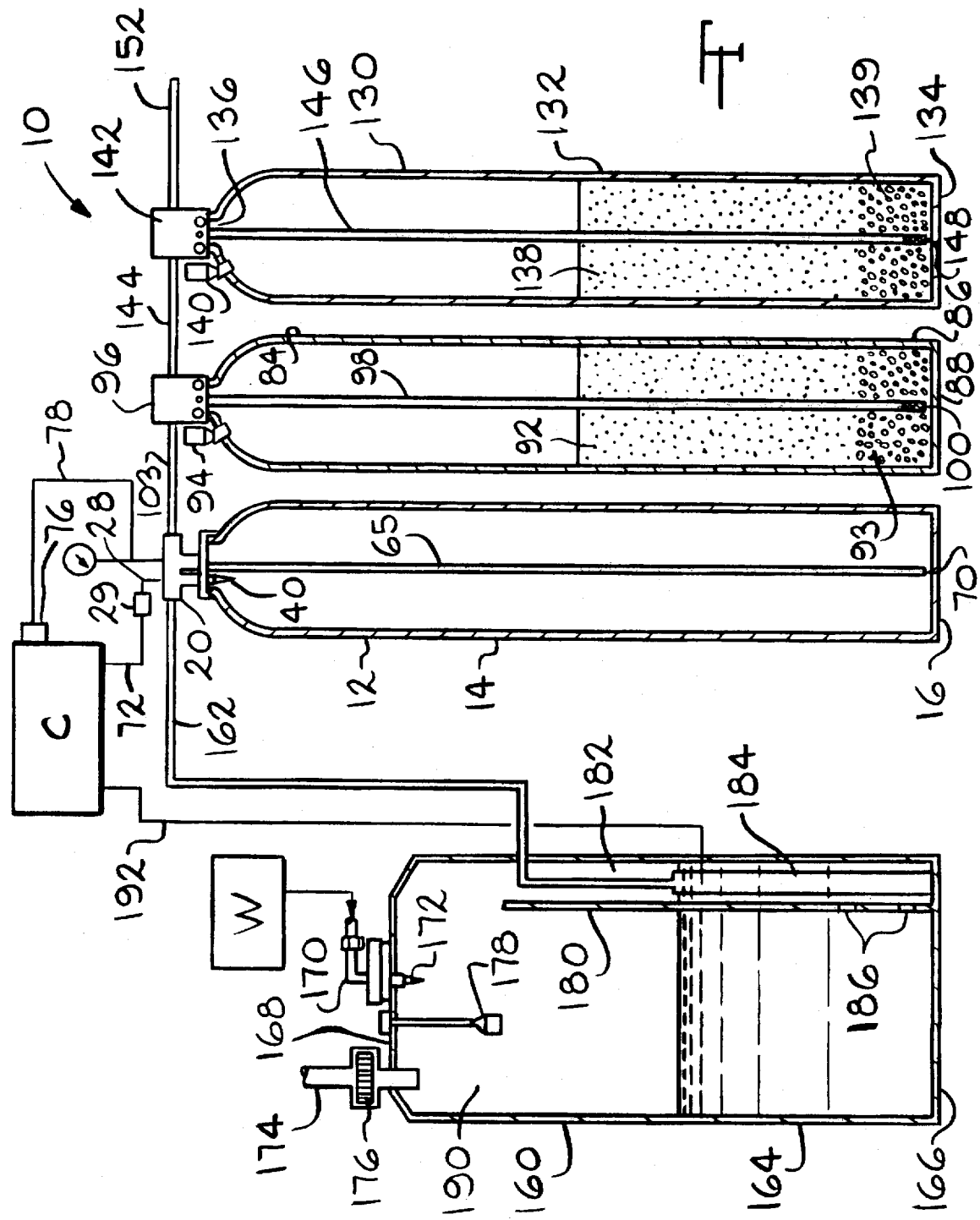
FIG. 3 is a schematic view of an alternative embodiment of the present invention with the tanks shown in cross section.

A third embodiment of the present invention is shown in FIG. 3. The apparatus 10 in this embodiment includes all of the features of the embodiment shown in FIG. 2 except the automatic valve 32 has been eliminated in the line leading to the manifold 20. Referring to FIG. 3, the apparatus 10 includes an auxiliary treating tank 160 that is in communication with the atomizing tank 12 through fluid line 162. The auxiliary treating tank 160 includes a cylindrical wall 164, a bottom wall 166 and an opposed top wall 168. The water source W is in communication with a valve 170 that is mounted on the top wall 168. A fogging nozzle 172 is in communication with the valve 170. The fogging nozzle 172 projects into the auxiliary treating tank 160. A power vent 174 having a draft inducer 176 is mounted on the top wall 168. A float 178 is mounted on the top wall 168. The float 178 maintains the water in the auxiliary tank 160 at a predetermined level. An internal chamber 180 defines a space 182 in which a submersible pump 184 is positioned. A plurality of openings 186 defined by the chamber 180 allows water to enter the space 182. The chamber 180 maintains an adequate water level in the space 182 so that the pump 184 is surrounded by water. This ensures that the pump 184 is adequately cooled during operation. The pump 184 causes water in the treating tank 160 to move through line 162 to the manifold 20.

As shown in FIG. 3, the cylindrical wall 164 of the auxiliary treating tank 160 defines an interior space 190 that is substantially vacant or devoid of physical objects. This allows the liquids, gases and solids entering the auxiliary tank 160 to move within the tank without interference.

The operation and method of the apparatus 10 as shown in FIG. 3, are similar to those described above for the previous two embodiments. However, in the third embodiment, water containing dissolved hydrogen sulfide from water source W enters valve 170 and passes through fogging nozzle 172. The fogging nozzle 172 causes the water to separate into discrete droplets. At this point, some of the dissolved hydrogen sulfide is released to a gas. The remaining droplets, which contain more hydrogen sulfide, collect in the bottom of the auxiliary tank 160 as shown in FIG. 3. The hydrogen sulfide gas is exhausted from the interior of the auxiliary treating tank 160 through the power vent 174. When the pressure drops in the atomizing tank 12, as described above, the compressor C sends an electrical signal through line 192 to the pump 184. The pump 184 then causes water from the auxiliary treating tank 160 to be moved through line 162 to the manifold 20. The water then proceeds through the atomizing tank 12 and the filtering tanks 84 and 130 as described above. It has been found that the apparatus 10 shown in FIG. 3 is especially suitable for applications where the water at water source W has dissolved hydrogen sulfide of 40 parts per million or greater.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A method for removing dissolved hydrogen sulfide from water, including the steps of:

(a) aerating water containing dissolved hydrogen sulfide with air at a predetermined pressure in an inlet channel defined by a manifold positioned within an open end of an atomizing tank, said inlet channel having a first inlet port and a second inlet port, said first inlet port being connected to a source of water containing dissolved hydrogen sulfide, said inlet channel being disposed downstream of said first inlet port, said inlet channel further being connected to a source of air under pressure, said inlet channel defining means for mixing said water containing dissolved hydrogen sulfide and said air under pressure to aerate said water; and (b) atomizing said water with a one-piece atomizing nozzle disposed in said atomizing tank and connected to said second inlet port of said manifold to cause said dissolved hydrogen sulfide to react with oxygen in said air to form sulfate in said atomizing tank.

2. The invention of claim 1, wherein said air under pressure is supplied to said inlet channel by an air compressor.

3. The invention of claim 1, wherein said predetermined pressure is in the range form about 30 p.s.i. to about 120 p.s.i.

4. The invention of claim 3, wherein said predetermined pressure is about 90 p.s.i.

5. The invention of claim 1, wherein said atomizing tank is in communication with filtering means for filtering said sulfate from said water.

6. The invention of claim 5, wherein said filtering means is comprised of at least one filtering tank containing a filter media.

7. An apparatus for removing dissolved hydrogen sulfide from water, comprising:

an atomizing tank defining an open end;

a manifold positioned within said open end, said manifold defining an inlet channel and an outlet channel, said inlet channel having a first inlet port and a second inlet port, said first inlet port being connected to a source of water containing dissolved hydrogen sulfide, said inlet channel being disposed downstream of said first inlet port, said inlet channel further being connected to a source of air under pressure, said inlet channel defining means for mixing said water containing dissolved hydrogen sulfide and said air under pressure to aerate said water;

a one-piece atomizing nozzle disposed in said atomizing tank and connected to said second inlet port for atomizing said water to cause said dissolved hydrogen sulfide to react with oxygen in said air to form sulfate in said atomizing tank; and at least one filtering tank in communication with said atomizing tank for filtering said sulfate from said water.

8. The invention of claim 7, wherein said second inlet port includes threads and said atomizing nozzle includes threads that mate with said threads of said second inlet port to affix said nozzle to said second inlet port.

9. The invention of claim 7, wherein said apparatus further includes a valve in communication with said first inlet port of said manifold.

10. The invention of claim 7, wherein said apparatus further includes a backwash control system in communication with said filtering tank.

11. The invention of claim 7, wherein said apparatus further includes a deaerating tank in communication with said filtering tank.

12. The invention of claim 7, wherein said outlet channel has a first outlet port and a second outlet port.

13. The invention of claim 12, wherein said apparatus further includes an atomizing tank tube in communication with said first outlet port.

14. The invention of claim 12, wherein said filtering tank is in communication with said second outlet port of said manifold.

15. The invention of claim 7, wherein said filtering tank contains a filter media.

16. The invention of claim 15, wherein said filter media is a mineral form of manganese dioxide.

17. The invention of claim 7, wherein said source of air includes an air compressor.

18. The invention of claim 17, wherein said compressor is in communication with a pressure switch that is actuated in response to pressure within said atomizing tank.

19. The invention of claim 7, wherein said air under pressure is in the range from about 30 p.s.i. to about 120 p.s.i.

20. The invention of claim 19, wherein said air under pressure is about 90 p.s.i.

21. The invention of claim 7, wherein said apparatus further includes an auxiliary treating tank in communication with said atomizing tank.

22. The invention of claim 21, wherein said auxiliary treating tank includes a fogging nozzle in communication with water containing dissolved hydrogen sulfide, a vent, and a pump to cause said water to be moved from said treating tank to said atomizing tank.

23. The invention of claim 22, wherein said vent includes a draft inducer.

24. The invention of claim 22, wherein said pump is positioned in said treating tank.

25. The invention of claim 22, wherein said treating tank further includes a float for maintaining said water at a predetermined level in said treating tank.

* * * * *